United States Patent
Tekavec

(10) Patent No.: US 6,350,089 B1
(45) Date of Patent: Feb. 26, 2002

(54) PICKUP TRUCK BED PORTABLE TIE-DOWN APPARATUS

(76) Inventor: Terence V. Tekavec, 7911 Ravenna Rd., Concord Twp., OH (US) 44077

( * ) Notice: Subject to any disclaimer, the term of this patent is extended or adjusted under 35 U.S.C. 154(b) by 0 days.

(21) Appl. No.: 09/539,048

(22) Filed: Mar. 30, 2000

Related U.S. Application Data

(60) Provisional application No. 60/127,030, filed on Mar. 31, 1999.

(51) Int. Cl.$^7$ .................................................. B60P 7/08
(52) U.S. Cl. ........................ 410/106; 410/101; 410/102; 410/110; 410/116
(58) Field of Search ............................... 410/101, 102, 410/104, 106, 110, 116; 24/129 B, 115 K, 265 CD; 248/499, 231.41, 231.61

(56) References Cited

U.S. PATENT DOCUMENTS

| | | | | |
|---|---|---|---|---|
| 4,760,986 A | * | 8/1988 | Harrison ................. | 410/110 X |
| 4,762,449 A | * | 8/1988 | St. Pierre et al. ............ | 410/107 |
| 4,850,770 A | * | 7/1989 | Millar, Jr. .................... | 410/110 |
| 4,953,820 A | * | 9/1990 | Yoder ..................... | 410/110 X |
| 5,326,203 A | * | 7/1994 | Cockrell .................... | 410/110 |
| 5,560,576 A | * | 10/1996 | Cargill .................. | 248/231.61 |
| 5,738,471 A | * | 4/1998 | Zentner et al. ............. | 410/110 |
| 5,873,688 A | * | 2/1999 | Wheatley .................... | 410/106 |
| 6,026,545 A | * | 2/2000 | Duggan ................ | 24/129 B X |
| 6,039,520 A | * | 3/2000 | Cheng ......................... | 410/106 |
| 6,113,328 A | * | 9/2000 | Claucherty .................. | 410/106 |
| 6,129,490 A | * | 10/2000 | Erskine et al. .............. | 410/110 |
| 6,139,235 A | * | 10/2000 | Vander Koy et al. ....... | 410/111 |

* cited by examiner

*Primary Examiner*—Stephen T. Gordon
(74) *Attorney, Agent, or Firm*—Fay, Sharpe, Fagan, Minnich & McKee, LLP

(57) ABSTRACT

A pickup truck bed portable tie-down apparatus for providing tie down points in an associated pickup bed includes a pair of cooperating clamping plate members held together by a set of bolt fasteners. One of the cooperating clamping plate members includes a set of threaded holes and the other is provided with a set of clearance holes so that the bolt fasteners can be selectively tightened to bring the plate members together into a cooperating clamping relationship onto the flange of an associated pickup truck bed. At least one of the cooperating clamping plate members carries one or more integral eyelets or hooks for connection of the subject pickup up truck bed portable tie-down apparatus to cargo straps or the like. The eyelets are embossed to provide strength at the eyelet and to minimize sharp edges that may cut into cargo ropes or straps. An outwardly extending flange area on one of the clamping plate members enables the device to be loosely connected in place anywhere along the edge of a pickup truck bed rail.

17 Claims, 7 Drawing Sheets

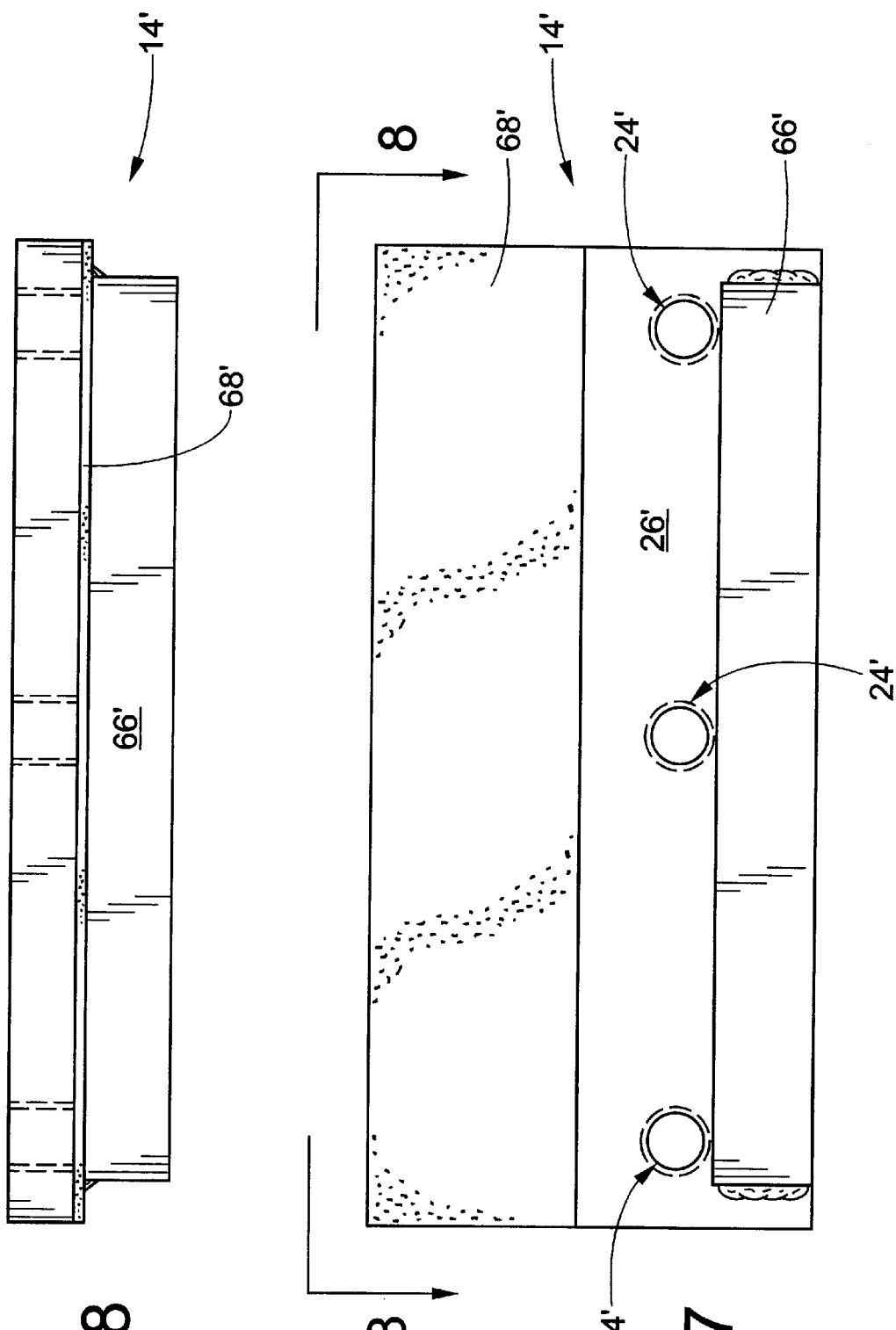

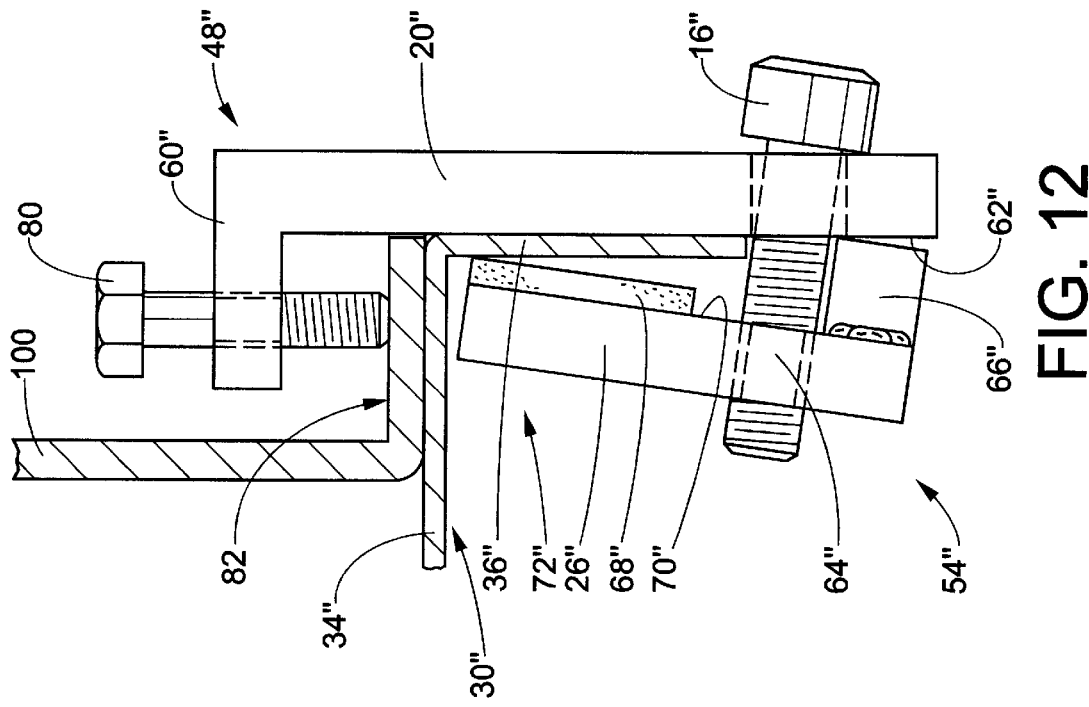
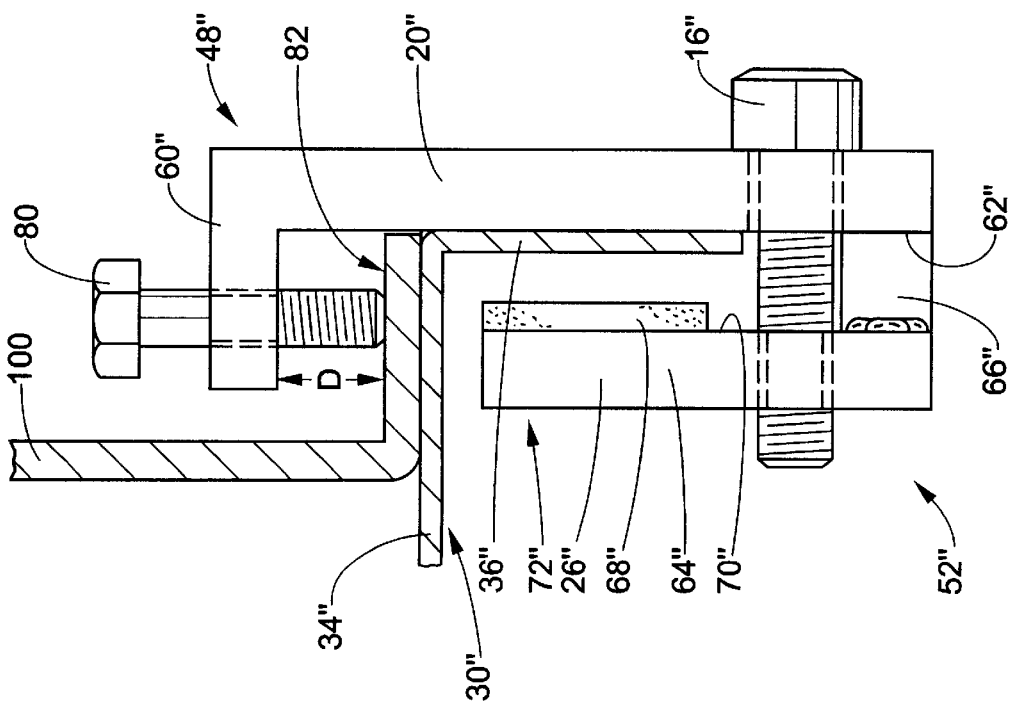

PICKUP TRUCK BED PORTABLE TIE-DOWN APPARATUS

CROSS-REFERENCE TO RELATED APPLICATION

This application claims the benefit of U.S. Provisional Application No. 60/127,030, filed Mar. 31, 1999.

BACKGROUND OF THE INVENTION

The present invention is related to the art of accessories used with pickup truck beds and, more particularly, to a portable tie-down apparatus having connection eyelets carried on a pair of cooperating plate members that are selectively clampable together for quick connection of the tie-down apparatus onto a structural flange formed around the perimeter of standard pickup truck beds.

Many vehicle manufacturers offer integral eyelets or connection tabs in the beds of their pickup truck vehicles. These connectors have proven useful as attachment points for ropes, chains, straps, or the like to hold cargo securely in place within the bed. Typically, the connectors provided by original equipment manufacturers are molded integrally with the pickup truck bed by welding them in place or by stamping eyelet holes in structural members. Further, they are normally located only at the extreme four corners of the bed.

One disadvantage of connectors of the type described above, however, is that they are not readily movable from their pre-installed positions. Rather, as noted above, the connectors supplied by the original equipment manufacturers are permanently fixed in their pre-established positions in the bed, typically in the four corners.

Other more portable connectors have been proposed, including stake bed pocket tie-down connectors. In those systems, the connectors typically include a main body formed of a resilient material, such as rubber, and an eyelet connected to one end of the body. In use, the resilient rubber body portion is inserted into the pickup truck stake pockets whereupon it is expanded using a nut and a bolt to compress or "squeeze" the rubberized main body within the pocket. This holds the main body, and in turn the connection eyelet, in place.

One disadvantage of connectors usable with stake pockets of the type noted is they are distinctly limited in where they can be used along truck bed top rails. In that regard, most full size pickup trucks have only three stake bed pockets on the driver's side rail and three pockets on the passenger's side. Therefore, these connectors are only usable at three pre-defined locations on each side of the vehicle.

Another disadvantage of the stake bed pocket type connectors is that they interfere with the use of other useful pickup truck accessories such as tonneau covers, truck caps, and the like. Although the main rubberized body of this type connector is received completely within the stake pockets and below the bed rail, the eyelet portions thereof protrude upwardly beyond the horizontal plane defined by the structural flange formed along the perimeter of most pickup truck beds.

It would, therefore, be desirable to provide a portable tie-down apparatus of the type that is useful in pickup truck bed applications. Preferably, the tie-down apparatus would not be limited for use at only a small number of predefined locations but, rather, would be usable along substantially the entire structural flange area around the full extent of the truck bed perimeter.

It would further be desirable to provide a portable tie-down apparatus that does not interfere with the use of tonneau covers, truck caps, or other accessory items that require unimpeded access to the top rail along the entire perimeter of the truck bed.

It would be still further desirable to provide a portable tie down apparatus that, in an alternative embodiment, is usable with truck caps to secure the cap onto the truck bed and simultaneously provide tie down connections such as eyelets or hooks for securing cargo within the truck bed.

SUMMARY OF THE INVENTION

The present invention, therefore, provides a portable tie-down apparatus for use with pickup truck beds that is easy to use and solves the problems identified above and others.

In accordance with the present invention, a pair of cooperating clamping plate members are held together by a set of bolt fasteners. Preferably, one of the cooperating clamping plate members includes a set of threaded holes and the other is provided with a set of clearance holes so that the bolt fasteners can be used to bring the plate members together into a cooperating clamping relationship. In that regard, the plate members are preferably disposed in a substantially parallel relationship so that, as they are brought together using the bolt fasteners, the subject portable tie-down device can be attached to the structural flange area formed around the perimeter of a pickup truck bed using a frictional interference-type connection.

Preferably, in accordance with one aspect of the invention, an outer plate member is substantially "L" shaped in cross section and includes a vertical planar main body portion having a flat inner face surface that is adapted to engage an associated downwardly projecting lip portion of the structural flange in the pickup truck bed. Outer edges of the main body portion carry at least one, but preferably two, integral eyelets or hooks for connection of the subject apparatus to cargo straps or the like. Preferably, the eyelets are embossed to provide strength at the eyelet and to minimize sharp edges that may cut into cargo ropes or straps. The upper edge of the main body portion includes at least one outwardly projecting horizontal support flange adapted to engage the top rail portion of the pickup bed structural flange. The support flange enables the subject device to be loosely connected to the pickup truck bed structural flange prior to its more secured clamped-on position.

The inner or backing plate member includes a substantially planar main body portion. The lower portion of the backing plate member engages the opposite lower lip inner surface of the outer plate member. The upper portion of the backing plate member is adapted to clamp the structural flange of the pickup truck bed between the backing plate member and the main body portion.

In an alternative embodiment, the backing plate member carries an inwardly projecting foot member adapted to engage the opposite flat inner face surface of the outer plate member. In addition, in the alternative embodiment, a resilient strip of high friction material is carried on the flat outer face surface along the upper area of the backing plate member. The friction material is adapted to abut against the back face of the lip portion of the associated structural truck bed flange.

A set of threaded holes on the backing plate member and a corresponding set of clearance holes on the outer plate member enable a set of bolt fasteners to be used to bring the cooperating clamping plate members of the subject portable tie-down apparatus into their cooperative clamping position onto the associated structural flange of a pickup truck bed. As the bolts are tightened, the lower portion of the backing plate member first contacts the flat inner face surface of the outer plate member. Thereafter, further tightening of the bolt fasteners causes the backing plate member to pivot, urging the upper portion of the backing plate member into engagement behind the lip area of the structural flange of the pickup truck bed. The lower portion of the backing plate member acts as a fulcrum to transmit the tension force generated in the bolt fasteners into a compressive force between the top portion of the backing plate member and the outer plate member, preferably with the structural flange of the pickup truck bed held pinched therebetween. In the alternative backing plate member embodiment, the foot member carried on the lower portion thereof acts as the fulcrum to convert the bolt fastener tension force into the preferred clamping force. The strip of high friction material ensures firm clamping to hold the tie-down apparatus firmly on the truck bed rail.

In a further alternative embodiment, the "L" shaped outer plate member extends upwardly beyond the vertical extent of the truck bed lip portion to provide a gap for receiving the outer perimeter engagement frame portion of an associated truck cap therein. A connection bolt member is threaded through the upper region of the outer plate member in an orientation to engage the perimeter frame of the cap onto the truck bed flange as the bolt is tightened. The outer plate member selectively carries a connection tie down member such as an eyelet, hook, or the like.

One primary advantage of the subject invention is that a tie-down type connector is provided that can be used substantially anywhere along the perimeter of a pickup truck bed.

Another advantage of the present invention is that, in an alternative embodiment, a low profile portable tie-down type connector is provided that can be used together with tonneau covers, truck caps, or the like.

Other benefits and advantages of the present invention will become apparent to those skilled in the art upon a reading and understanding of the subject application.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein:

FIG. 7 is a front plan view of a backing plate member formed in accordance with a second preferred embodiment of the invention;

FIG. 8 is a top plan view of the backing plate member taken along line 8—8 of FIG. 7;

FIG. 11 is a cross sectional view illustrating a further alternative embodiment of the subject tie-down apparatus adapted for use with a truck cap and shown in a loose, pre-connected, configuration; and, FIG. 12 is a view of the portable apparatus of FIG. 11 arranged in a clamped-on installed position holding the perimeter frame of an associated truck cap tightly connected with the structural flange of an associated truck bed flange.

DETAILED DESCRIPTION OF THE PREFERRED EMBODIMENTS

Figure 1:
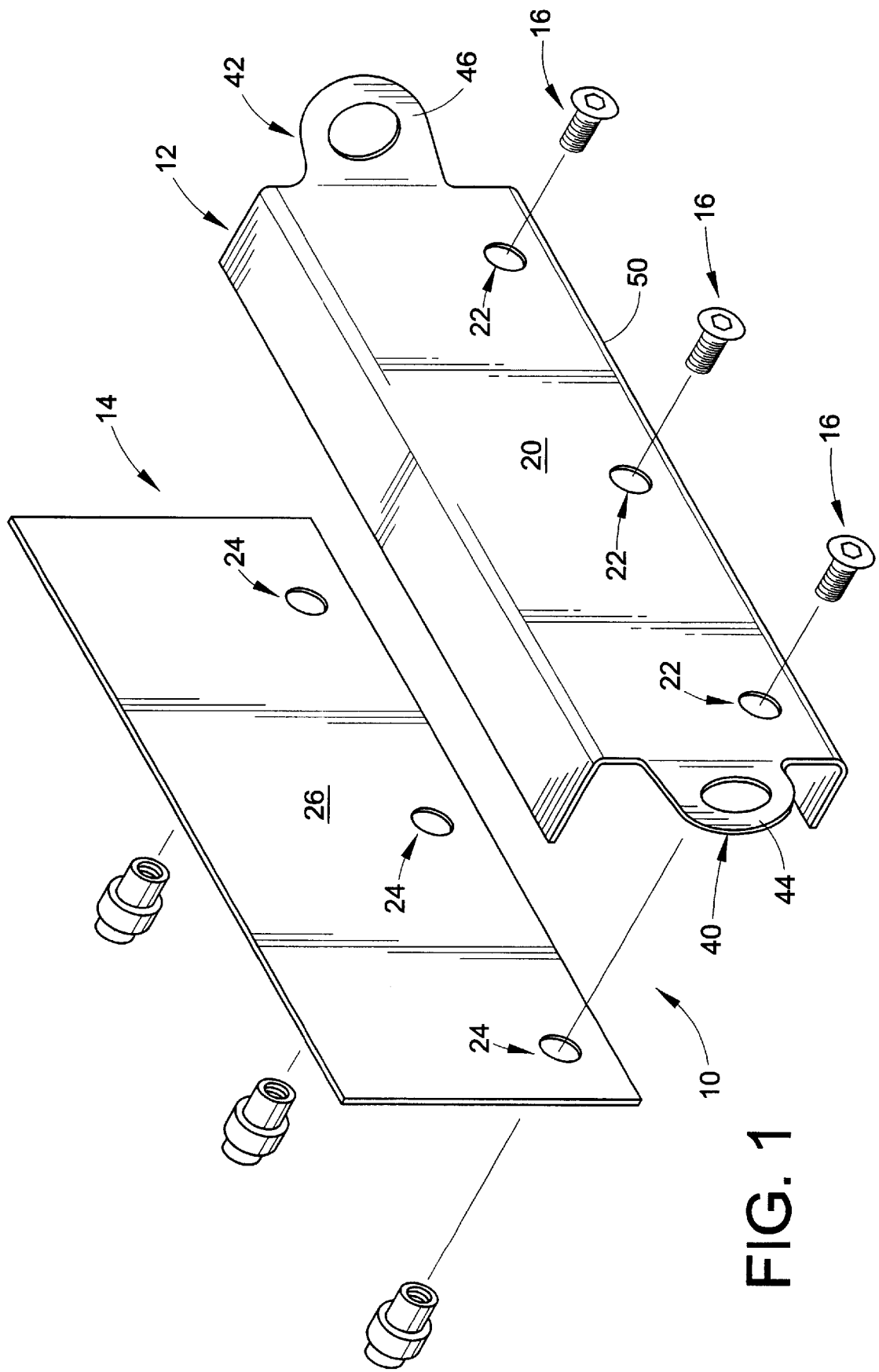
FIG. 1 is an isometric exploded view illustrating the major components of the subject portable tie-down apparatus.

Referring now to the drawings wherein the showings are for the purposes of illustrating the preferred embodiments of the invention only and not for purposes of limiting same, FIG. 1 shows the overall arrangement of the subject portable tie-down apparatus 10 including a pair of cooperating clamping plate members 12, 14 that are selectively held together by a set of bolt fasteners 16, preferably formed of stainless steel. As shown, an outer plate member 20 includes a set of clearance holes 22 disposed on the outer plate member in a spaced apart relationship substantially as shown. The clearance holes 22 accommodate the set of bolt fasteners 16 and are sized to enable the fasteners to pass freely through the outer plate member and into threaded engagement with a corresponding set of threaded holes 24 formed on the backing plate member 26. Preferably, the set of threaded holes 24 are formed by press-fitting a set of clinch nuts into the backing plate member 26. The fasteners are used to bring the plate members together into their cooperating clamping relationship onto an associated structural flange of a pickup truck bed as shown best in FIG. 2.

In that regard, as shown in FIGS. 1–4, the plate members are preferably disposed in a substantially parallel relationship during use so that, as they are brought together and clamped using the bolt fasteners, the subject portable tie-down apparatus 10 can be attached to the structural flange area formed around the perimeter of a pickup truck bed using a frictional interference-type connection.

Figure 2:
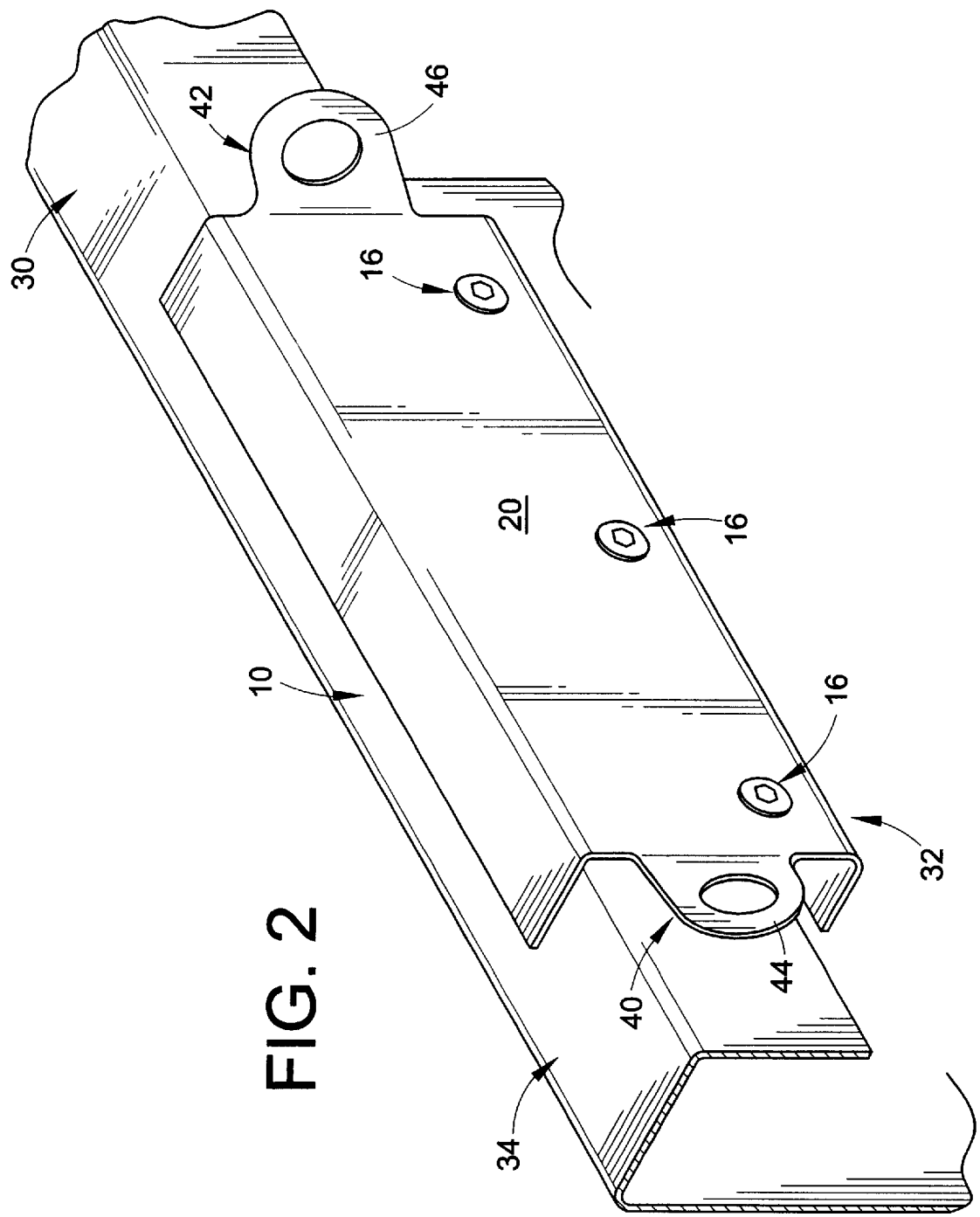
FIG. 2 is an isometric view of the subject portable tie-down apparatus installed on the structural flange of an associated pickup truck bed.
Figure 4:
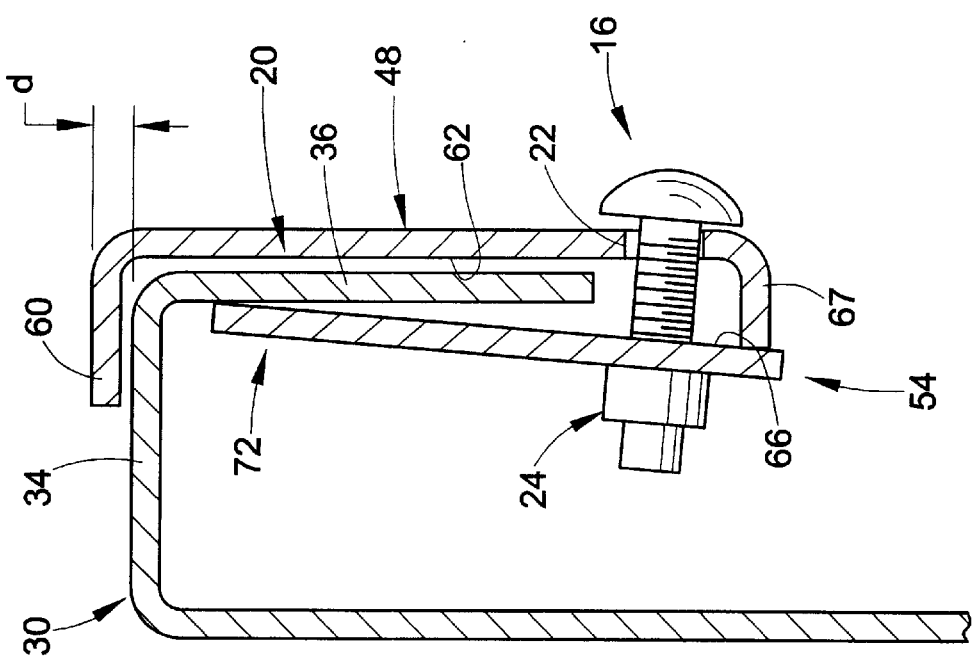
FIG. 4 is a view of the subject portable tie-down apparatus of FIG. 3 arranged in a clamped-on installed position on the structural flange of the associated pickup truck bed.
Figure 3:
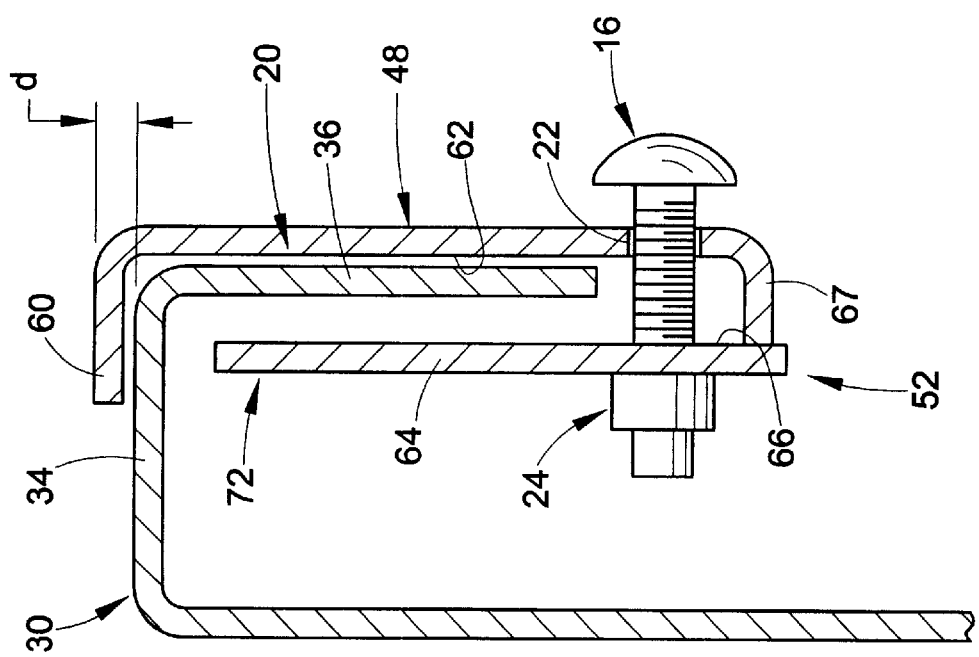
FIG. 3 is a cross sectional view taken along line 3—3 of FIG. 5 illustrating the subject portable tie-down apparatus in a loose, pre-connected, configuration.
Figure 6:
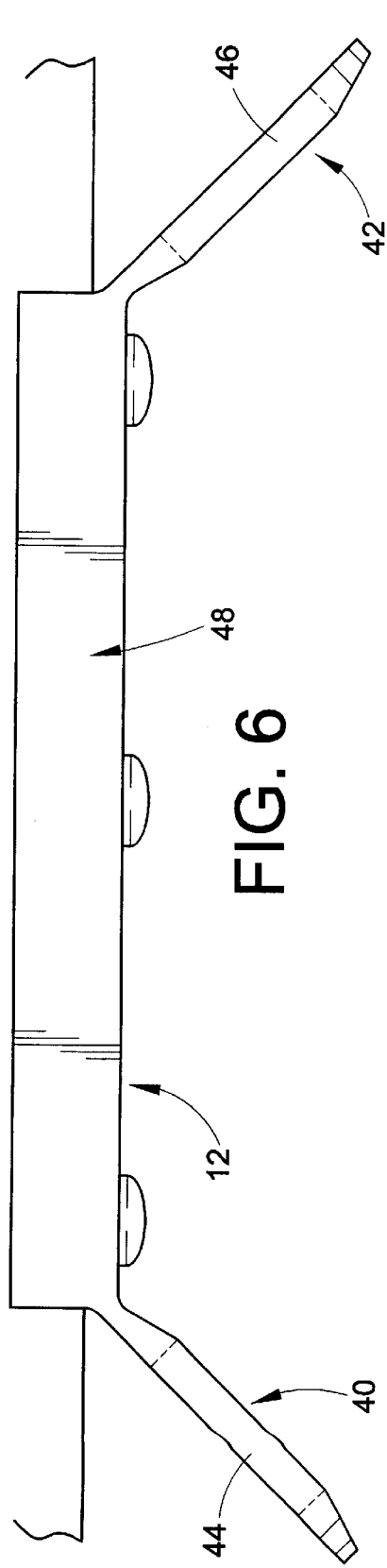
FIG. 6 is a top plan view of the outer plate member.
Figure 5:
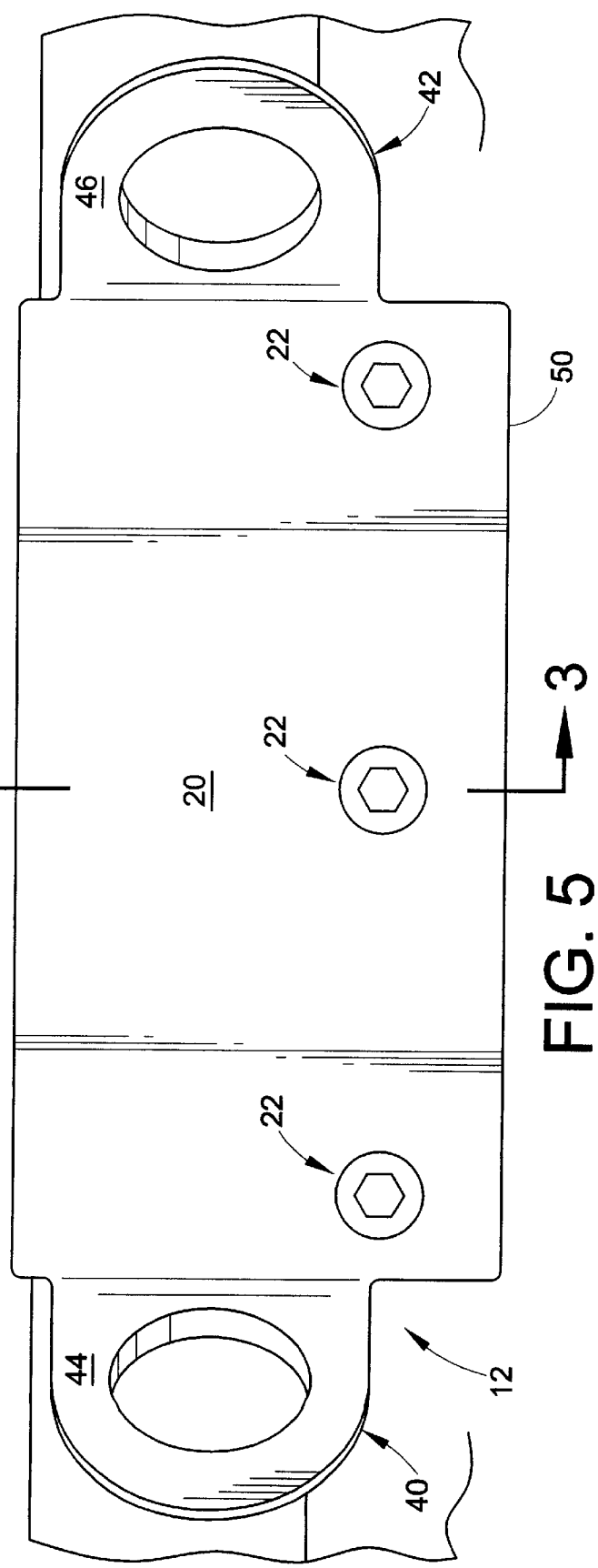
FIG. 5 is a front plan view of the outer plate member.
Figure 10:
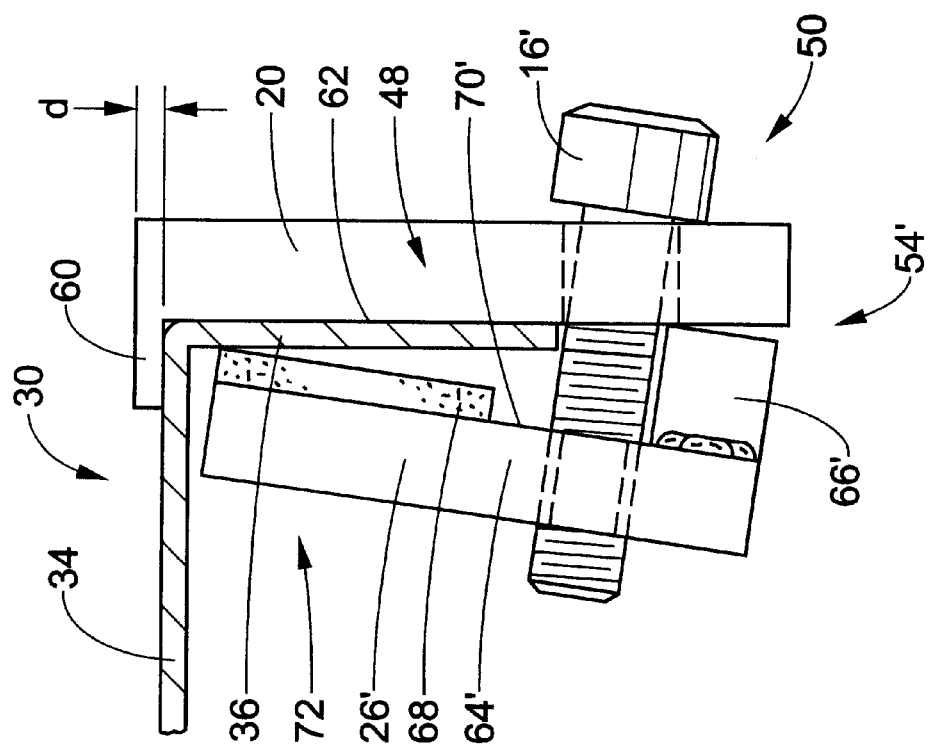
FIG. 10 is a cross sectional view of the tie down apparatus of FIG. 9 shown in a clamped-on installed position on the structural flange of the associated pickup truck bed.
Figure 9:
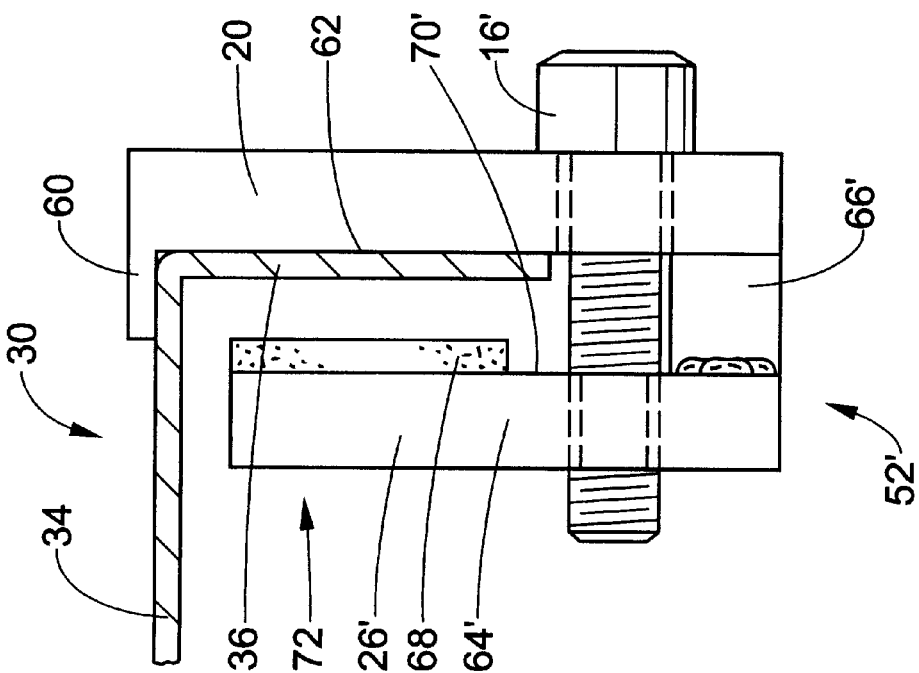
FIG. 9 is a cross sectional view illustrating the subject tie-down apparatus with the alternative backing plate members in a loose, pre-connected configuration.

The subject portable tie-down apparatus 10 is illustrated in a pre-installation configuration in FIG. 3 and in its installed configuration in FIGS. 2 and 4. As shown there, the subject apparatus is adapted to clamp onto the structural flange 30 of an associated pickup truck bed 32. The typical structural flange 30 includes a top rail portion 34 disposed in a generally horizontal plane and a lip area 36 held in a substantially vertical orientation.

Of particular importance to the subject invention, as shown in FIGS. 1, 2, 5, and 6, the outer plate member 20 includes a pair of connection areas 40, 42, preferably comprised of a pair of eyelets 44, 46. As illustrated, the eyelets extend on opposite sides of a main body portion 48 of the outer plate member 20. The eyelets are bent outwardly from the main body portions to provide clearance between the eyelet and the flange of the truck bed. Alternatively, the connection areas 40, 42 may comprise other configurations that function as a connection including hooks, snap-lock clips, or the like. In addition, the connection areas could be located anywhere on the outer plate member including along the main body portion 48 at or below the lower edge 50. Moreover, outer plate 20 can be configured to connect apparatus that span the truck bed such as load bars, bike carriers, and equipment racks.

FIGS. 3 and 4 illustrate the subject portable tie-down apparatus 10 in a pre-installation position 52 relative to the associated structural flange and an installed position 54, respectively. With reference now to those FIGURES in particular but with reference also to FIGS. 5 and 6, it can be seen that the outer plate member 20 is substantially "L" shaped and includes an outwardly projecting support flange 60 adapted to engage the top rail portion 34 of the structural flange 30 of the associated pickup truck bed. Further, the main body portion 48 includes a substantially planar main face surface 62 formed thereon in a manner corresponding to the vertically oriented lip area 36 of the structural flange. The support flange 60 preferably extends upwardly only a small amount d above the plane defined by the top rail portion 34 so that the pickup truck bed, with the subject connection device in place, can be used with other accessory items that attach directly onto the top rail portion.

The backing plate member 26 includes a substantially planar main body portion 64 and a lower portion 66 adapted to engage a lower lip member 67 extending from the flat inner surface 62 of the outer plate member 20.

Of particular importance to the portability of the subject invention, the set of bolt fasteners 16 extend through the set of clearance holes 22 formed in the outer plate member 20 and into a correspondingly arranged set of threaded holes 24 preferably formed in the backing plate member 26 by a set of clinch nuts pressed into the backing plate member. The interaction between the components as described above enables the subject portable tie-down apparatus to be used anywhere on the associated structural flange of the pickup truck bed.

Functionally, as the bolts 16 are tightened, the lower portion 66 is brought into abutment with the flat inner lower lip member 67 of the outer plate member 20. Thereafter, further tightening of the bolt fasteners 16 urges the upper portion 72 of the backing plate member 26 into engagement behind the lip area 36 of the structural flange 30 of the pickup truck bed. The lower lip member 67 acts as a fulcrum or pivot point against the lower portion 66 of the backing plate member 26 to transmit the tension force generated in the bolt fasteners into a compressive force between the top portion 72 of the backing plate member and the outer plate member, preferably with the structural flange 30 of the associated pickup truck bed held pinched therebetween.

With reference now to FIGS. 7-10, an alternative embodiment of the backing plate member will be described. In the description to follow, like elements to those described above with similar design or function will be indicated using like reference numerals having a primed (') suffix. The backing plate member 26' of the alternative embodiment includes a substantially planar main body portion 64' and an inwardly projecting foot member 66' adapted to engage the flat inner surface 62' of the outer plate member 20'. Further, a resilient strip 68 is carried on the flat outer face surface 70' of the backing plate member 26' as shown. Preferably, the resilient strip is formed of a high friction material, such as, for example, rubber and is adapted to compress as necessary to accommodate a irregular truck bed flange surfaces. Essentially, the resilient material provides an interface between the flat outer face surface 70' of the backing plate member 26' and the lip area 36 of the structural flange 30 of the pickup truck bed.

Operationally, as the bolts 16' are tightened, the foot member 66 is brought into abutment with the flat inner face surface 62 of the outer plate member 20. Thereafter, further tightening of the bolt fasteners 16' urges the upper portion 72 of the backing plate member 26 into engagement behind the lip area 36 of the structural flange 30 of the pickup truck bed. The foot member 66 carried on the backing plate member 26 acts as a fulcrum or pivot point to transmit the tension force generated in the bolt fasteners into a compressive force between the top portion 72' of the backing plate member and the outer plate member, preferably with the structural flange 30 of the associated pickup truck bed held pinched therebetween.

FIGS. 11 and 12 illustrate yet another alternative embodiment of the subject portable tie-down apparatus in a pre-installation position 52" relative to the associated structural flange and an installed position 54", respectively. In the description to follow, like elements to those described above with similar design or function will be indicated using like reference numerals having a double primed (") suffix.

With reference now to FIGS. 11 and 12, it can be seen that the outer plate member 20" is substantially "L" shaped and includes an outwardly projecting support flange 60" as shown. The support flange 60" is preferably held in a spaced apart relationship relative to the plane defined by the top rail portion 34" so that the pickup truck bed, with the subject connection device in place, can be used with an associated truck cap 100 as shown. To that end, the support flange 60" carries a connection bolt member 80 that is adapted to engage the perimeter engagement frame 82 of the associated truck cap. The support flange 60" preferably extends upwardly by a distance D above the plane defined by the top rail portion 34" so that the pickup truck bed, with the subject connection device in place, can be used to receive the perimeter engagement frame 82 of the associated truck cap between the bolt 80 and the rail 34" as shown.

The backing plate member 26" includes a substantially planar main body portion 64" and an inwardly projecting foot member 66" adapted to engage the flat inner surface 62" of the outer plate member 20". Further, an optional resilient strip 68" is carried on the flat outer face surface 70" of the backing plate member 26" as shown. Preferably, if used, the resilient strip is formed of a high friction material such as, for example, rubber and is adapted to compress as necessary to accommodate irregular truck bed flange surfaces. Essentially, the resilient material provides an interface between the flat outer face surface 70" of the backing plate member 26" and the lip area 36" of the structural flange 30".

Functionally, as the bolts 16" are tightened, the foot member 66" is brought into abutment with the flat inner face surface 62" of the outer plate member 20". Thereafter, further tightening of the bolt fasteners 16" urges the upper portion 72" of the backing plate member 26" into engagement behind the lip area 36" of the structural flange 30" of the pickup truck bed. After the bolt fasteners 16" are used to securely fasten the backing plate member and outer plate member onto the structural flange 30" of the associated pickup truck bed, the one or more connection bolt members 80 are tightened to thereafter fasten the perimeter engagement frame 82 of the associated truck cap in place on the top rail portion 34 as shown.

In the above embodiment it is to be understood that the outer plate member 20" could equally be formed with a lower lip member (not shown) such as, for example, the lower lip member 67 shown in FIGS. 1, 3 and 4. In that case, the foot member 66" on the backing plate member 26" is no longer necessary, thus simplifying the overall construction of the device.

One primary advantage of the subject invention is that a tie-down type connector is provided that is usable substantially anywhere along the perimeter of a pickup truck bed.

Another benefit of the present invention is that a low profile portable tie-down type connector is provided that can be used together without interfering with tonneau covers, truck caps, or other accessory items that attach directly onto the top rail portion of pickup truck beds.

Yet another advantage of the present invention is that a portable device is provided for securing a truck cap onto a pickup truck bed rail.

The invention has been described with reference to the preferred and alternative embodiments. Obviously, modifications and alterations will occur to others upon a reading and understanding of this specification. It is intended to include all such modifications and alterations insofar as they come within the scope of the appended claims or the equivalence thereof.

Having thus described the invention, it is claimed:

1. A portable tie-down apparatus for selective clamping onto an associated flange area formed around an outer perimeter of an associated pickup truck bed, the portable tie-down apparatus comprising:
   a face plate member contoured to selectively engage a first surface of the associated flange area;
   a backing plate member including an engagement portion oriented to contact a second surface of the associated flange area opposite said first surface when the face plate member and the backing plate member are selectively brought into an assembled clamped relationship on said associated flange area;
   at least one connecting member integrally formed on the face plate member, the at least one connecting member adapting the portable tie-down apparatus for selective connection with an associated cargo securing member holding cargo in the associated pickup truck bed; and,
   at least one fastener operable to cause relative clamping movement between the face plate member and the backing plate member to bring the face plate member and the backing plate member into said assembled clamped relationship on said associated flange area.

2. The portable tie-down apparatus according to claim 1 wherein the face plate member includes:
   a substantially planar main body portion contoured to selectively engage said first surface of the associated flange area; and,
   a top lip portion extending from a top edge of the substantially planar main body portion in a first direction substantially perpendicular to the main body portion, the top lip portion contacting a third surface of the associated flange area to prevent relative movement between the face plate member and the associated flange area enabling loose connection of the portable tie-down apparatus on the associated flange area prior to said relative clamping movement between the face plate member and the backing plate member to said assembled clamped relationship.

3. The portable tie-down apparatus according to claim 2 wherein the face plate member further includes:
   a bottom lip portion extending from a bottom edge of the substantially planar main body portion in said first direction substantially perpendicular to the main body portion, the bottom lip portion contacting the backing plate member when the face plate member and the backing plate member are brought into said assembled clamped relationship on said associated flange area.

4. The portable tie-down apparatus according to claim 3 wherein:
   the bottom lip portion and the backing plate member contact at an interface when the face plate member and the backing plate member are brought into said assembled clamped relationship on said associated flange area.

5. The portable tie-down apparatus according to claim 4 wherein said interface defines a pivot area between the face plate member and the backing plate member when the at least one fastener is operated to cause said relative clamping movement between the face plate member and the backing plate member.

6. The portable tie-down apparatus according to claim 1 wherein the at least one fastener is operative to loosely connect the face plate member with the backing plate member prior to movement of the face plate member and the backing plate member into said assembled clamped relationship on said associated flange area.

7. The portable tie-down apparatus according to claim 1 wherein:
   the backing plate member is substantially planar; and,
   the engagement portion of the backing plate member includes an edge of the substantially planar backing plate member.

8. The portable tie-down apparatus according to claim 1 wherein the at least one fastener includes a plurality of threaded fasteners.

9. The portable tie-down apparatus according to claim 1 wherein the at least one connecting member includes at least one eyelet integrally formed with the face plate member.

10. The portable tie-down apparatus according to claim 9 wherein the at least one eyelet integrally formed with the face plate member includes a pair of eyelets extending in opposite directions from opposite sides of said face plate member.

11. The portable tie-down apparatus according to claim 1 wherein the backing plate member further includes:
   a lower foot member extending from a bottom edge of the backing plate member, the lower foot member contacting the face plate member when the backing plate member and the face plate member are brought into said assembled clamped relationship on said associated flange area.

12. The portable tie-down apparatus according to claim 11 wherein the engagement portion of the backing plate member carries a strip of resilient material adapted to provide a high friction interface between the backing plate member and said second surface of the associated flange area.

13. The portable tie-down apparatus for selective clamping onto an associated flange area formed around an outer perimeter of an associated pickup truck bed, the portable tie-down apparatus comprising:
   a face plate member adapted to selectively engage a first surface of the associated flange area;
   a backing plate member adapted to selectively engage a second surface of the associated flange area opposite said first surface when the face plate member and the backing plate member are selectively brought into an assembled clamped relationship on said associated flange area;
   at least one tie-down connection area integral with the face plate member; and,
   at least one fastener operable to cause relative clamping movement between the face plate member and the backing plate member to bring the face plate member and the backing plate member into said assembled clamped relationship on said associated flange area.

14. The portable tie-down apparatus according to claim 13 wherein the at least one fastener includes:

a plurality of stainless steel threaded fasteners; and, a plurality of nuts attached to said backing plate member.

15. The portable tie-down apparatus according to claim 13 wherein the at least one tie-down connection area includes at least one embossed eyelet integrally formed with the face plate member.

16. The portable tie-down apparatus according to claim 15 wherein the at least one embossed eyelet integrally formed with the face plate member includes a pair of embossed eyelets extending in opposite directions from opposite sides of said face plate member.

17. The portable tie-down apparatus according to claim 13 wherein the face plate member and the backing plate member are formed of stamped metal.

* * * * *